(12) United States Patent
Zettsu et al.

(10) Patent No.: US 11,003,356 B2
(45) Date of Patent: May 11, 2021

(54) MEMORY SYSTEM

(71) Applicant: Toshiba Memory Corporation, Minato-ku (JP)

(72) Inventors: Tatsuya Zettsu, Yokohama (JP); Yoshihisa Kojima, Kawasaki (JP)

(73) Assignee: Toshiba Memory Corporation, Minato-ku (JP)

( * ) Notice: Subject to any disclaimer, the term of this patent is extended or adjusted under 35 U.S.C. 154(b) by 13 days.

(21) Appl. No.: 16/421,618

(22) Filed: May 24, 2019

(65) Prior Publication Data
US 2019/0278478 A1    Sep. 12, 2019

Related U.S. Application Data

(60) Division of application No. 16/105,476, filed on Aug. 20, 2018, now abandoned, which is a continuation of application No. 15/267,734, filed on Sep. 19, 2016, now Pat. No. 10,095,414.

(60) Provisional application No. 62/304,485, filed on Mar. 7, 2016.

(51) Int. Cl.
*G06F 12/02* (2006.01)
*G06F 3/06* (2006.01)

(52) U.S. Cl.
CPC .............. *G06F 3/061* (2013.01); *G06F 3/064* (2013.01); *G06F 3/0619* (2013.01); *G06F 3/0647* (2013.01); *G06F 3/0652* (2013.01); *G06F 3/0679* (2013.01); *G06F 12/0246* (2013.01); *G06F 3/0653* (2013.01); *G06F 3/0655* (2013.01); *G06F 2212/1032* (2013.01); *G06F 2212/7205* (2013.01)

(58) Field of Classification Search
CPC ......... G06F 12/0246; G06F 2212/1032; G06F 2212/7205; G06F 3/061; G06F 3/0619; G06F 3/064; G06F 3/0647; G06F 3/0652; G06F 3/0653; G06F 3/0655; G06F 3/0679
See application file for complete search history.

(56) References Cited

U.S. PATENT DOCUMENTS

| | | |
|---|---|---|
| 8,725,931 B1 | 5/2014 | Kang |
| 2012/0066438 A1 | 3/2012 | Yoon et al. |
| 2015/0026391 A1 | 1/2015 | Su et al. |

*Primary Examiner* — Yong J Choe
(74) *Attorney, Agent, or Firm* — Oblon, McClelland, Maier & Neustadt, L.L.P.

(57) ABSTRACT

A memory system includes a nonvolatile memory having memory blocks; and a controller configured to receive a request for writing user data from a host; select at least a first block having a first percentage of valid data among the memory blocks, determine a second percentage different from the first percentage on the basis of at least the first percentage of the valid data in the first block, determine a first ratio between a write amount of the user data in accordance with the request from the host and a write amount of the valid data in at least the first block on the basis of the second percentage determined, and write the user data and the valid data in the first block into the nonvolatile memory on the basis of the first ratio.

10 Claims, 10 Drawing Sheets

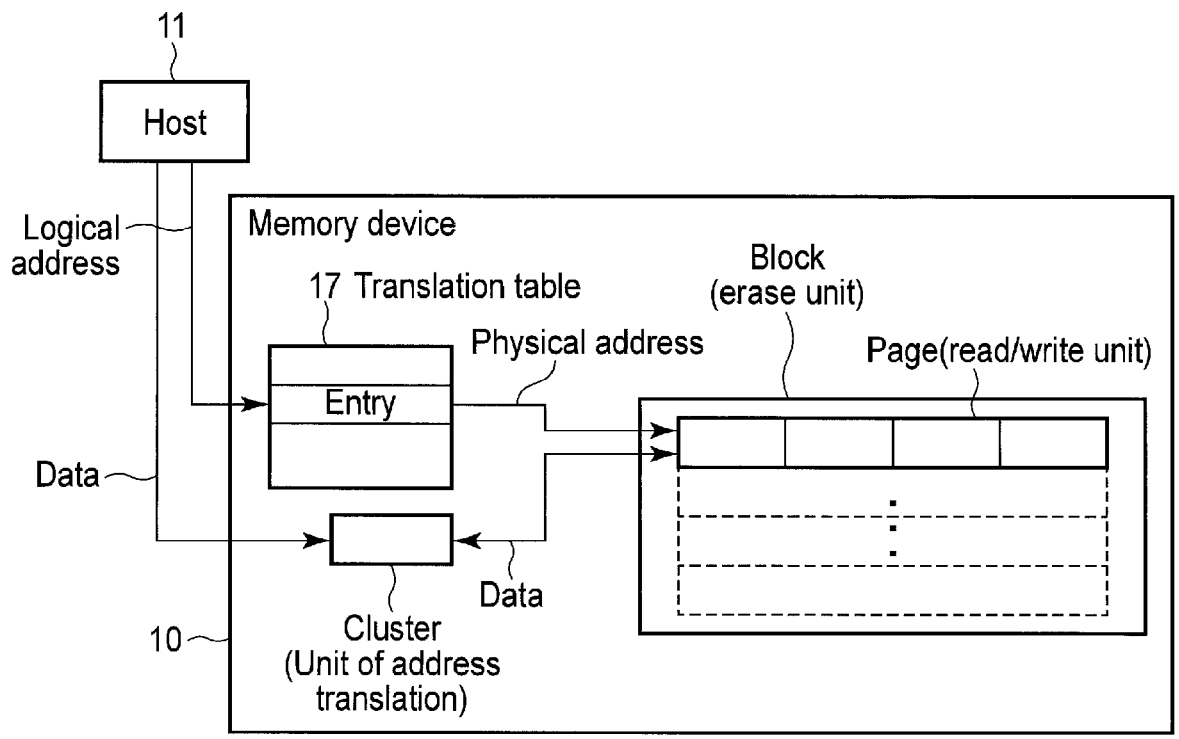
F I G. 2
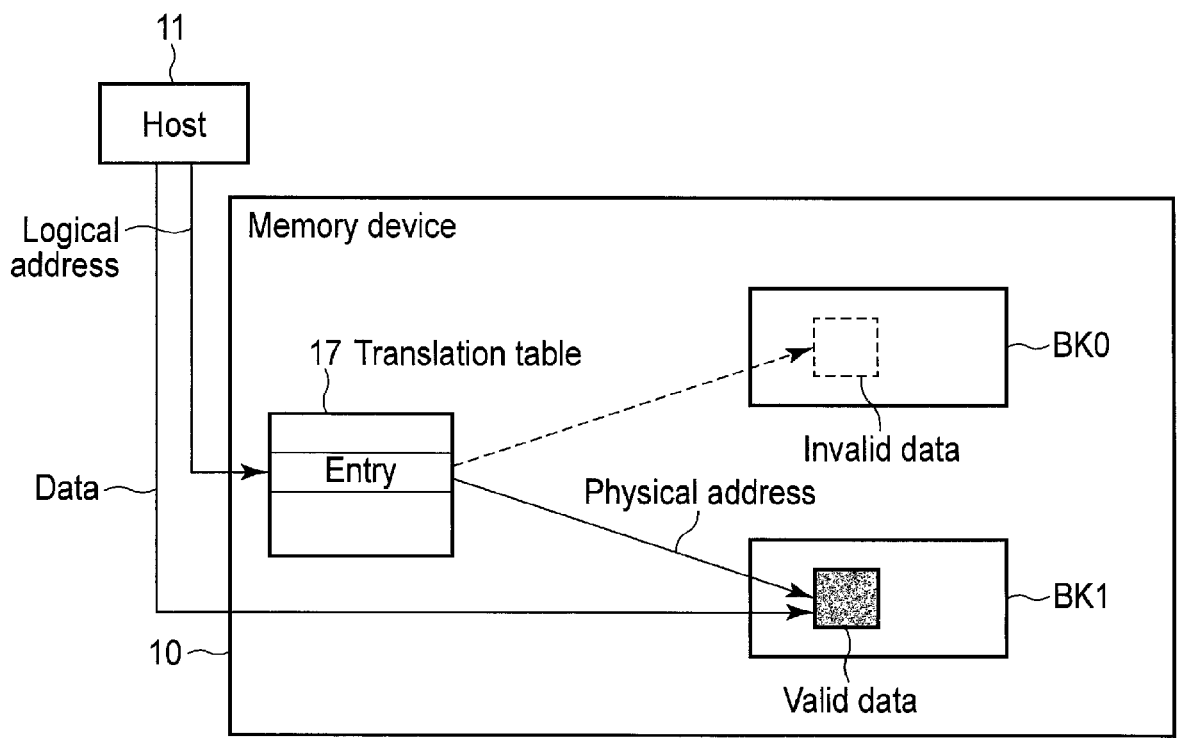
F I G. 3

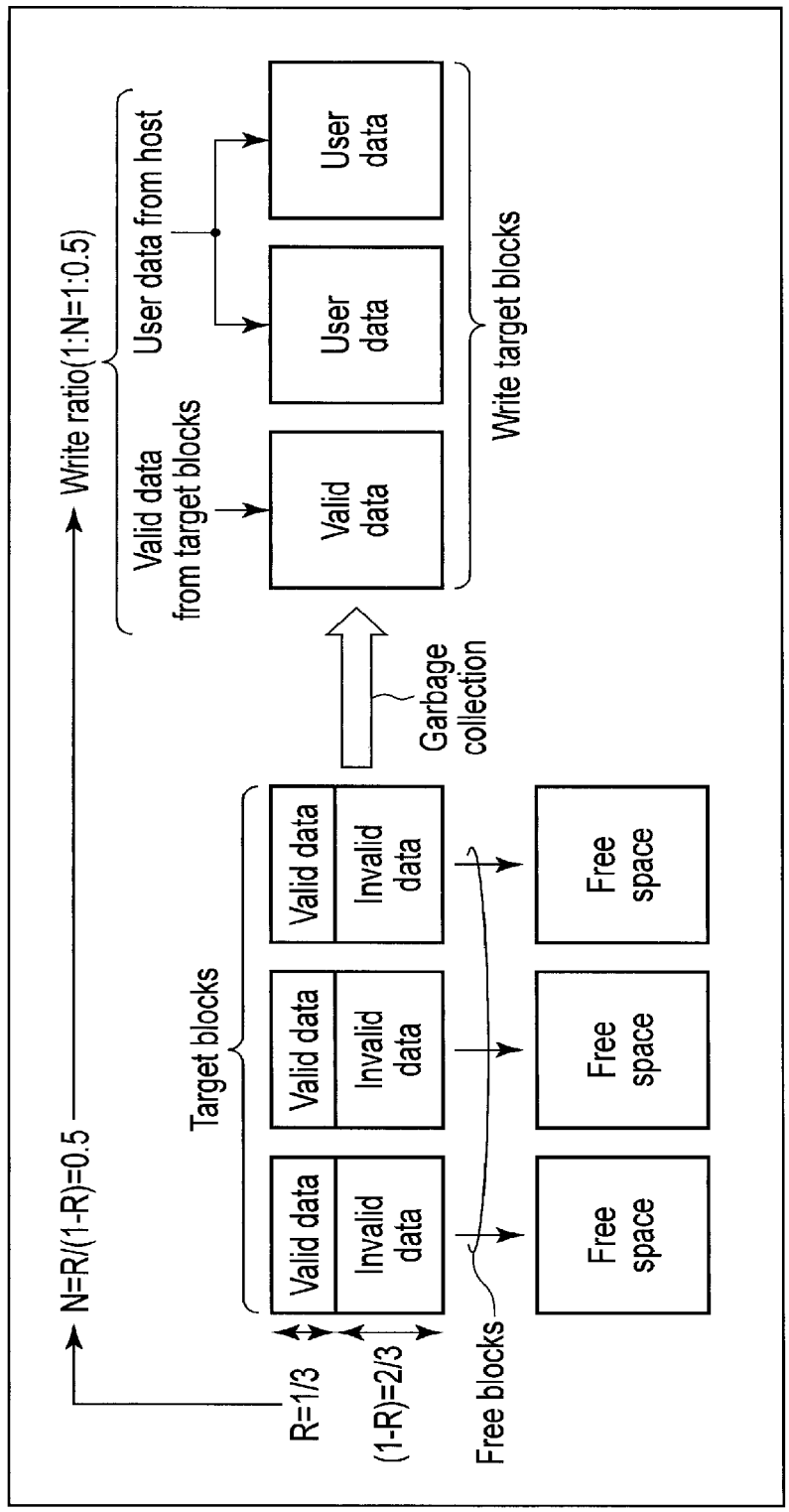
F I G. 6

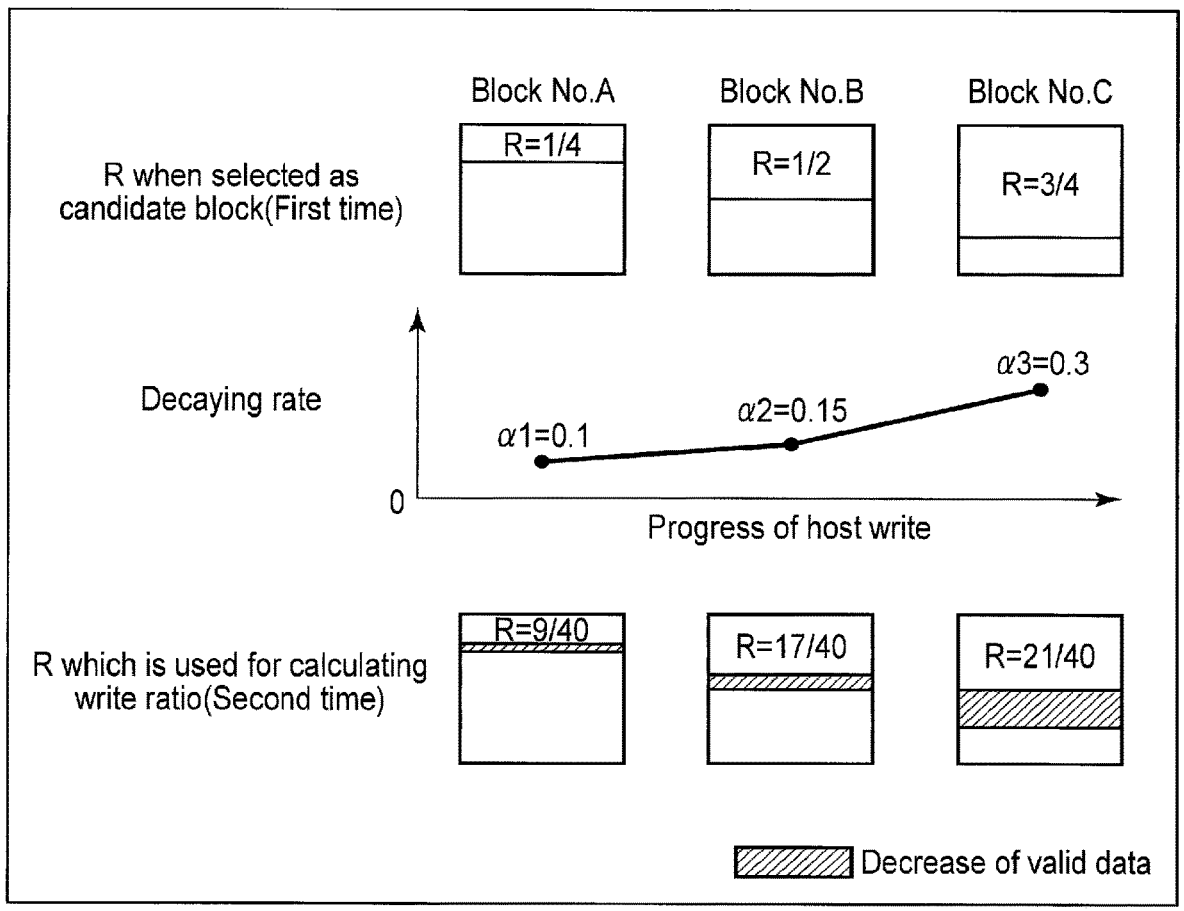
F I G. 12

MEMORY SYSTEM

CROSS-REFERENCE TO RELATED APPLICATIONS

This application is a division of and claims the benefit of priority under 35 U.S.C. § 120 from U.S. application Ser. No. 16/105,476 filed Aug. 20, 2018, which is a continuation of U.S. application Ser. No. 15/267,734 filed Sep. 16, 2016 (now U.S. Pat. No. 10,095,414 issued Oct. 9, 2018), and claims the benefit of priority from U.S. Provisional Application No. 62/304,485 filed Mar. 7, 2016, the entire contents of each of which are incorporated herein by reference.

FIELD

Embodiments described herein relate generally to a memory system.

BACKGROUND

A memory system which comprises a nonvolatile memory and a controller controlling the nonvolatile memory performs a process of writing (relocating) data written to a block in the nonvolatile memory to another block in the nonvolatile memory apart from a process of writing user data based on a request from a host.

BRIEF DESCRIPTION OF THE DRAWINGS

FIG. 2 shows an example of a data structure in the system of FIG. 1.

FIG. 3 shows an example of overwriting user data.

FIG. 6 and FIG. 7 show examples of garbage collection.

FIG. 12 shows a calculation example of percentage of valid data using the decaying factor.

DETAILED DESCRIPTION

In general, according to one embodiment, a nonvolatile memory having memory blocks; and a controller configured to: select a first block and a second block among the memory blocks; determine a third percentage on the basis of a first percentage of valid data in the first block and a second percentage of valid data in the second block; determine a first ratio between a write amount of user data in accordance with a request from a host and a write amount of the valid data into the first block on the basis of the third percentage; and write the user data and the valid data in the first block into the nonvolatile memory on the basis of the first ratio.

Embodiments

Figure 1:
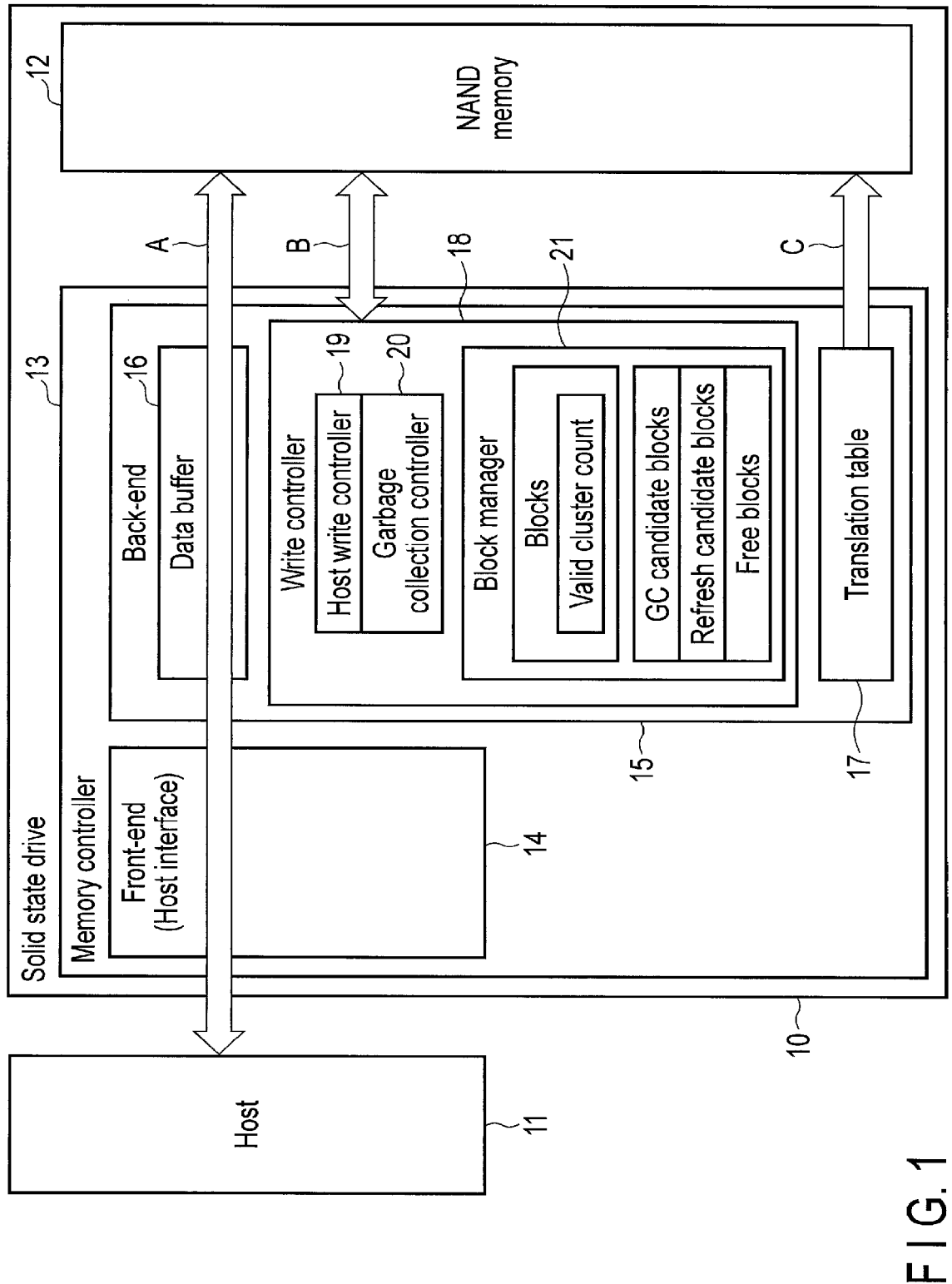
FIG. 1 shows a memory system according to an embodiment.

FIG. 1 shows a memory system according to an embodiment.

A solid-state drive (SSD) 10 is a device which is allowed to be connected to a host 11. The SSD 10 may be replaced by a memory device such as a USB memory. The host 11 is an electronic device such as a personal computer or a mobile device. The host 11 may be an imaging device such as a digital still camera or a video camera, a tablet computer, a smartphone, a game console, a car navigation system, a printer, a scanner or a server system.

The SSD 10 comprises a NAND memory 12 which is an example of a nonvolatile memory, and a memory controller 13 which controls the NAND memory 12. The NAND memory 12 is a memory in which data can be stored in a nonvolatile manner. The NAND memory 12 may comprise memory cells having a two-dimensional structure or may comprise memory cells having a three-dimensional structure.

The memory controller 13 controls reading or writing for the NAND memory 12 in response to a read command or a write command from the host 11, and for example, controls reading or writing for the NAND memory 12 based on its own determination. The latter control is performed in, for example, garbage collection for increasing a free block (free space into which data can be written) by writing (relocating) fragmented data stored in a plurality of blocks, and refresh for decreasing rate of read errors by writing (ECC processing and relocating) data in a block in which the rate of occurrence of read errors is increased.

The memory controller 13 comprises a front-end 14 and a back-end 15. The front-end 14 is a portion which receives a read command and a write command from the host 11 and notifies the host 11 of results of the read command and the write command. The front-end 14 includes a host interface. The back-end 15 is a portion which controls reading/writing for the NAND memory 12. The back-end 15 comprises a memory interface connected to the NAND memory 12.

In reading or writing based on a command from the host 11, data is transferred between the host 11, the NAND memory 12, and the memory controller 13 (arrow A). In reading or writing which is performed by the memory controller 13 itself, such as garbage collection or refresh, data is transferred between the NAND memory 12 and the back-end 15 of the memory controller 13 (arrow B).

In these types of reading or writing, data is temporarily stored into a data buffer 16. The data buffer 16 may be, for example, a static random access memory (SRAM) or a synchronous dynamic random access memory (SDRAM). The data buffer 16 may be a nonvolatile RAM such as a magnetoresistive random access memory (MRAM), a resistive random access memory (ReRAM) or a ferroelectric random access memory (FeRAM). The data buffer 16 may be provided outside the memory controller 13.

The access to the NAND memory 12 is performed using a physical address obtained from a translation table 17 in the back-end 15. The physical address is transferred from the back-end 15 to the NAND memory 12 (arrow C). The translation table 17 associates a logical address as identifier of user data with a physical address of the NAND memory 12 in which the user data is actually stored.

A write controller 18 controls writing for the NAND memory 12. A host-write controller 19 controls writing based on a write command from the host 11. A garbage collection controller 20 controls writing based on garbage collection. Here, the garbage collection controller 20 further controls writing based on refresh. These controls will be explained later.

The write controller 18 concurrently performs writing of user data based on a request from the host 11 and writing of data (valid data) which is read from the NAND memory 12 by the garbage collection or the refresh. In this case, the write controller 18 determines write ratio between write amount of user data based on a request from the host 11 and write amount for writing data which is read from the NAND memory 12 by the garbage collection or the refresh to the NAND memory 12.

The write amount refers to amount of data written into the NAND memory 12 in a certain period. When the write amount is increased, the throughput of data writing is high. It should be noted that, when the amount of data written into the NAND memory 12 in a certain period is same write amount of user data and write amount of data read from the NAND memory 12 have a trade-off relationship in which, when one of the amounts is increased, the other amount is decreased. Thus, determination of the write ratio is important.

A method for determining the write ratio is described later.

For example, a block manager 21 manages state of each of the blocks in the NAND memory 12 in the garbage collection and the refresh. A block refers to the erase unit in the NAND memory 12. For example, the block manager 21 manages the amount of valid data in each block. The block manager 21 manages a plurality of garbage collection (GC) candidate blocks as the candidates for garbage collection. The block manager 21 manages a plurality of refresh candidate blocks for the target of refresh. The block manager 21 manages a plurality of free blocks to which user data can be written.

Now, this specification explains the properties of the NAND memory.

FIG. 2 shows an example of a data structure in the system of FIG. 1.

For example, user data transfers between the SSD 10 and the host 11 in sector units. A cluster is the minimum unit of address translation of data in the SSD 10, wherein cluster size sector size. A logical address is translated into a physical address in cluster units by the translation table 17. Data is stored in the page specified by a physical address.

A page is the read/write unit in the NAND memory. For example, a page size is n times a cluster size, where n is an integer greater than or equal to one. The figure shows that the page size is four times of the cluster size (for example, 4 Kbytes). As explained above, a block is the erase unit in the NAND memory. In the data structure of this example, cluster size≤page size<block size.

Thus, in the NAND memory, the read/write unit is different from the erase unit.

As shown in FIG. 3, when overwriting data, for example, new data is written to block BK1 different from block BK0 in which current data is stored. The translation table 17 showing the relationship between logical addresses and physical addresses is updated. In this case, new data in block BK1 becomes valid data (a valid cluster). Current data in block BK0 becomes invalid data (an invalid cluster).

The number of invalid data items is increased when the above data overwriting has been repeated. Invalid data does not function as user data. In addition, invalid data occupies the storage area in the NAND memory. Thus, an increase of invalid data means a decrease in the storage area in which user data can be stored.

To ensure enough amount of the storage area in which user data can be stored, invalid data needs to be erased. On the other hand, in the NAND memory, data must be erased in block units as stated above.

In view of the above situation, copying garbage collection (copying GC) is performed as described below.

Figure 4:
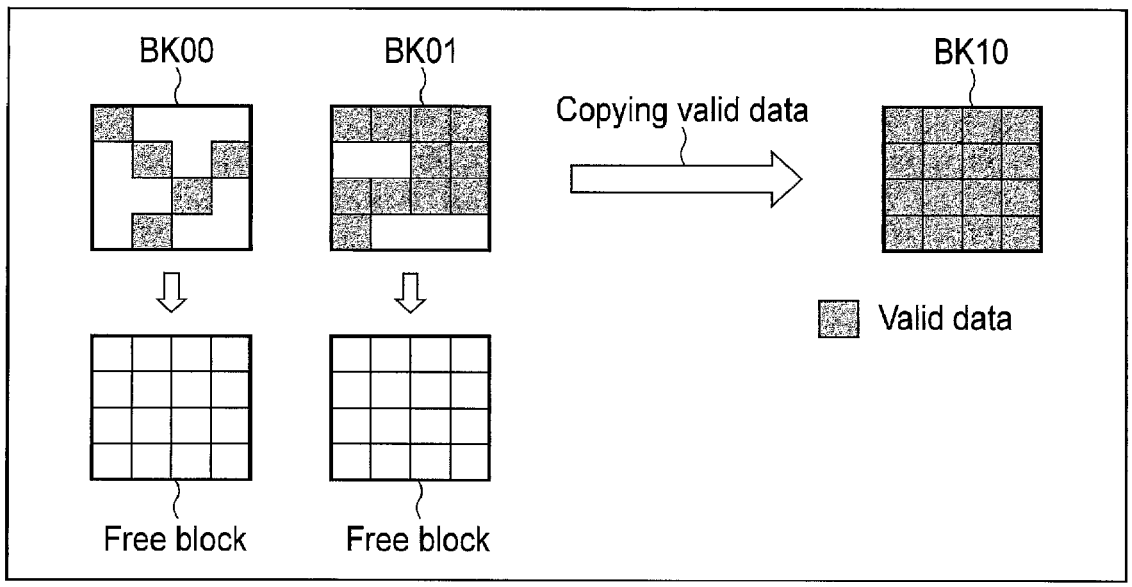
FIG. 4 shows an example of garbage collection.

For example, as shown in FIG. 4, garbage collection is an operation for changing a plurality of blocks BK00 and BK01 to free blocks in the following manner. Valid data in blocks BK00 and BK01 in the NAND memory is written (copied) to write target block (new block) BK10 in the NAND memory (compaction), and further, the data in blocks BK00 and BK01 is invalidated. By erasing the invalidated data, the free blocks become write target blocks (new blocks) to which user data can be written.

For example, NAND memory is a not overwritable storage device, and thus, in general, the memory capacity (the number of blocks) is greater than the logical address range (the number of blocks) which can be specified by a host. The logical address range which can be specified by a host is called a user capacity. The actual memory capacity of a NAND memory is called a physical capacity. The difference between the physical capacity and the user capacity is called an overprovisioning capacity.

Garbage collection is an internal operation of the memory device. Thus, writing of user data based on a request from the host may be restricted during garbage collection. The ratio between the write amount of user data based on a request from the host and the write amount of user data (valid data) based on garbage collection during garbage collection is called a write ratio which we represent with form 1:N, where N is a number greater than or equal to zero.

Figure 5:
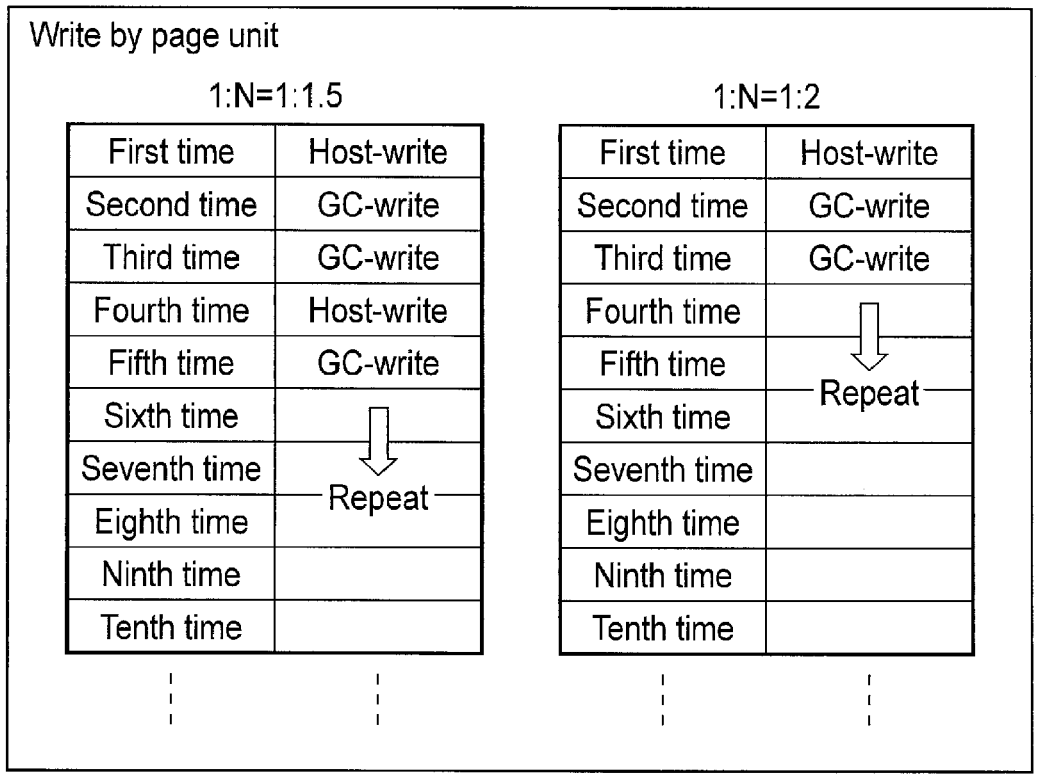
FIG. 5 shows an example of a write ratio.

For example, as shown in FIG. 5, when data is written in page units, and further when the write ratio is 1:1.5, the ratio between writing of user data based on a request from the host (host-write) and writing of user data based on garbage collection (GC-write) is 1:1.5. For example, a cycle of host-write, GC-write, GC-write, host-write and GC-write is repeated.

When data is written in page units, and further when the write ratio is 1:2, the ratio between writing of user data based on a request from the host (host-write) and writing of user data based on garbage collection (GC-write) is 1:2. For example, a cycle of host-write, GC-write and GC-write is repeated.

As described above, the writing of user data based on a request from the host and the writing of user data based on garbage collection (GC-write) are switched in a small unit. Therefore, the writing of user data based on a request from the host is equalized in time. That is, a state where the writing of user data based on a request from the host is inhibited in a long time is not generated.

Garbage collection is performed, for example, when the number of free blocks is less than a given number for the following reason. A free block practically cannot be obtained without garbage collection. When the number of free blocks is decreased, write target blocks cannot be assured. Thus, garbage collection cannot be performed. In this manner, such a deadlock arises.

The number of free blocks (the given number) as the condition to start garbage collection can be determined on the basis of the worst write ratio which is determined on the basis of, for example, the user capacity and physical capacity of the memory device, and the memory capacity necessary to store data (the translation table, management information, etc.) other than user data. The worst write ratio is the write ratio in which N is assumed to be the greatest.

The write ratio (1:N) is determined on the basis of, for example, the percentage of valid data in one target block relative to data which can be stored in the target block (in other words, relative to the total capacity of the block). Here, the target block refers to the block from which user data (valid data) is going to be transferred by garbage collection. The percentage is shown by R ($0 \leq R \leq 1$). It should be noted that R=0 indicates that the percentage of valid data is 0%. R=1 indicates that the percentage of valid data is 100%.

Now, this specification explains an example in which the write ratio (1:N) is calculated from R. When the percentage of valid data in one target block is R, the percentage of invalid data in the target block is 1−R. When the valid data in the target block is transferred to one free block, the percentage of valid data in the free block becomes also R. Here, the memory capacity of the target block is assumed to be the same as that of the free block.

At this time, the percentage of the free space of the free block is 1−R. Thus, in addition to writing of valid data (R) in one target block to one free block, writing of user data (1−R) based on a request from the host can be concurrently performed without changing the number of free blocks.

This operation is performed on the basis of a write ratio of 1:N. This write ratio can be shown by the following equations:

$$1:N=(1-R):R$$

$$N=R/(1-R) \qquad (1)$$

It should be noted that N is the write amount of valid data in one target block when the write amount of user data based on a request from the host is one.

The relationship between the write ratio (1:N) and R is explained, using other examples.

Figure 7:
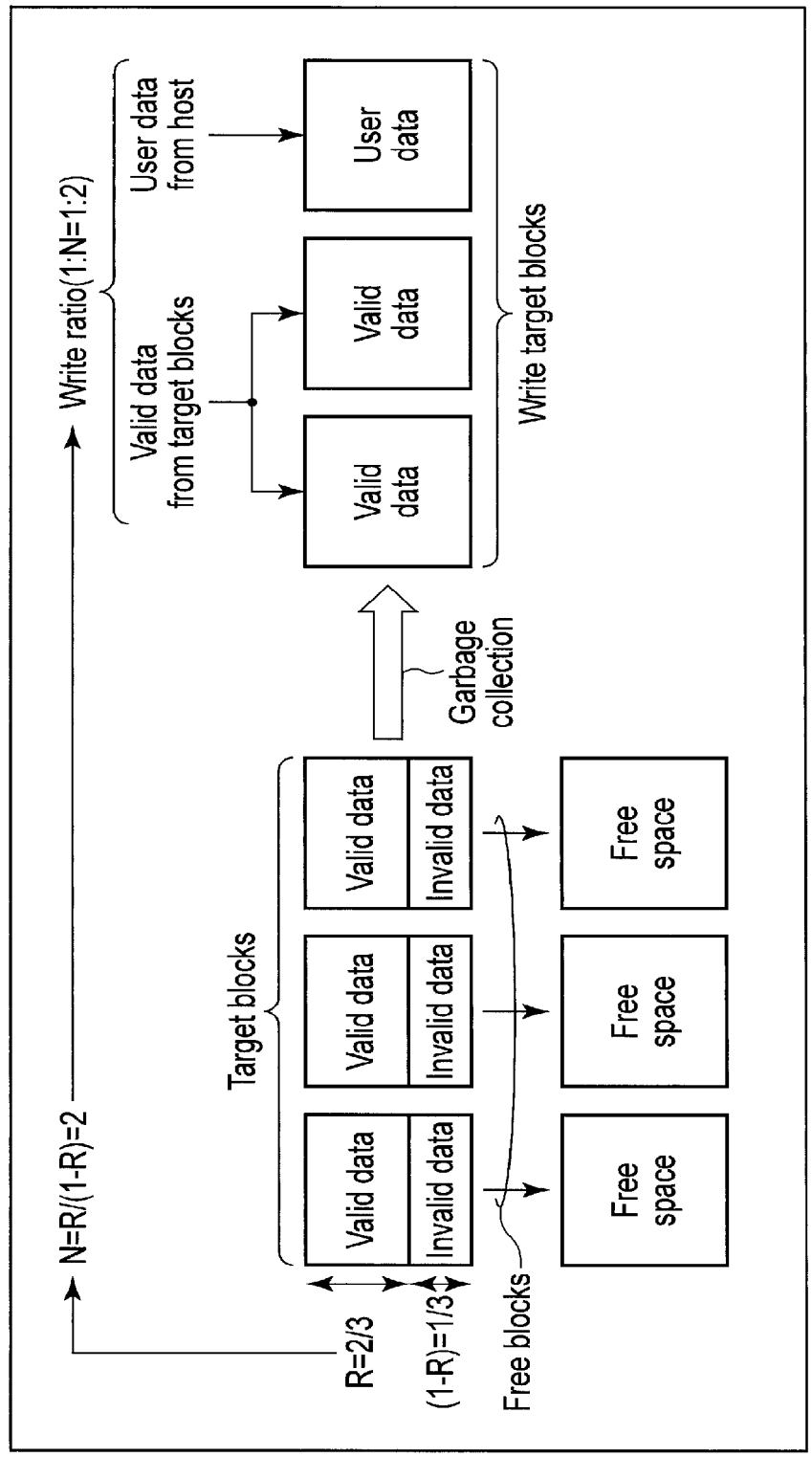

FIG. 6 and FIG. 7 show examples of garbage collection.

In the example of FIG. 6, the ratio (R:1-R) of valid data to invalid data is the same in three target blocks which are the targets of garbage collection. The ratio is assumed to be R:(1−R)=(1/3):(2/3)=1:2.

In this case, the valid data in the three target blocks is transferred to one write target block by garbage collection. (Thus, one write target block is consumed.) By invalidating the valid data, the three target blocks become three free blocks. When the data in the three free blocks have been erased, three new write target blocks are obtained.

This garbage collection increases the number of write target blocks (unused blocks) by three, and decreases the number of write target blocks (unused blocks) by one. Thus, in total, the garbage collection increases the number of write target blocks by two.

From another viewpoint, it is possible to concurrently perform writing of valid data in three target blocks to one write target block and writing of user data from the host to two write target blocks based on a write ratio of 1:N=1:0.5.

In the example of FIG. 7, the ratio (R:1-R) of valid data to invalid data is the same in three target blocks which are the targets of garbage collection. The ratio is assumed to be R:(1−R)=(2/3):(1/3)=2:1.

In this case, the valid data in the three target blocks is transferred to two write target blocks by garbage collection. (Thus, two write target blocks are consumed.) By invalidating the valid data, the three target blocks become three free blocks. When the data in the three free blocks have been erased, three new write target blocks are created.

This garbage collection increases the number of write target blocks (unused blocks) by three, and decreases the number of write target blocks (unused blocks) by two. Thus, in total, the garbage collection increases the number of write target blocks by one.

From another viewpoint, it is possible to concurrently perform writing of valid data in three target blocks to two write target blocks and writing of user data from the host to one write target block based on a write ratio of 1:N=1:2.

As is clear from the above, when the percentage of valid data in one target block for garbage collection is less, the write amount of user data from the host can be increased during garbage collection.

In consideration of the above factor, in garbage collection, a plurality of candidate blocks which satisfy a given condition are selected in advance from a plurality of blocks in the NAND memory. From the candidate blocks, one block in which the percentage R of valid data is the least is preferably selected as the actual target block for garbage collection.

The candidate blocks which satisfy a given condition are, for example, a plurality of blocks within a given place (for example, the twentieth place) in the percentage of valid data when a plurality of blocks in the NAND memory are sorted in ascending order based on the percentage of valid data (specifically, the block having the least percentage of valid data is in the first place).

As stated above, the write ratio (1:N) is determined on the basis of the percentage R of valid data in one target block from which user data (valid data) is going to be transferred by garbage collection.

This means that the write ratio heavily depends on the percentage R of valid data in one target block. Even when one target block is selected from a plurality of candidate blocks, the percentage R of valid data in the target block is assumed to vary widely depending on the situation.

If the write ratio (1:N) is greatly changed in the direction in which N is increased, the write amount (throughput) of user data is suddenly decreased when viewed from the host. When viewed from the host, the write performance deteriorates rapidly. This situation is not preferable.

In particular, when valid data in one target block which requires refresh is transferred to a free block in a manner similar to that of garbage collection, the percentage R of the valid data in the target block may be very large (R may be equal or almost equal to one). In this case, in refresh, writing of user data from the host can be hardly performed. Thus, some measures are required.

Refresh is an operation for reducing the rate of occurrence of read errors of user data by performing ECC process and rewriting process. These processes are performed to a block in which the rate of occurrence of read errors is increased. For example, refresh is applied to a block in which the number of read errors has exceeded a given value.

In wear leveling, user data may be transferred in a manner similar to that of garbage collection. Thus, similarly, in wear leveling, it is preferable to prevent a considerable change in the write ratio. Wear leveling is an operation for equalizing the wear of a block (memory cell) which is caused by repeating writing/erasing among a plurality of blocks in the NAND memory.

When the write ratio (1:N) is determined on the basis of the percentage R of valid data in one single target block from which user data (valid data) is going to be transferred by garbage collection, the write ratio may be greatly changed. Thus, the write performance may deteriorate rapidly when viewed from the host.

To solve this problem, in the operations described below, the write ratio is not determined on the basis of the percentage R of valid data in one single target block. Instead, the write ratio is determined in consideration of the percentages R of valid data in multiple target blocks selected from a plurality of candidate blocks. When refresh is performed during garbage collection, in addition to the target blocks selected from a plurality of candidate blocks, the percentage R of valid data in the target block for refresh is used to determine the write ratio.

In this manner, when valid data in target blocks is transferred in garbage collection, refresh, etc., the write ratio can be leveled among the target blocks.

Figure 8:
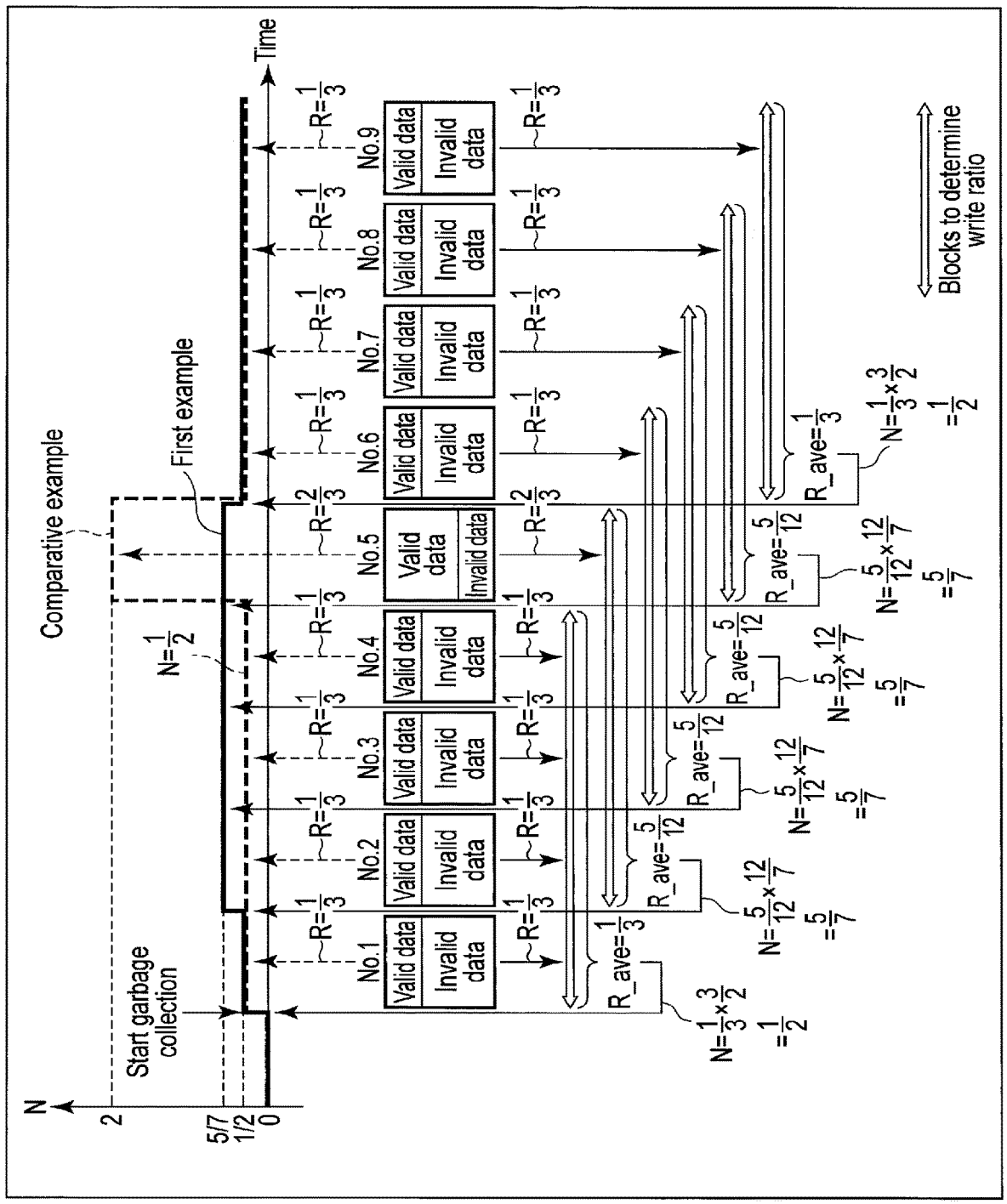
FIG. 8 shows a first example of calculation of a write ratio.
Figure 9:
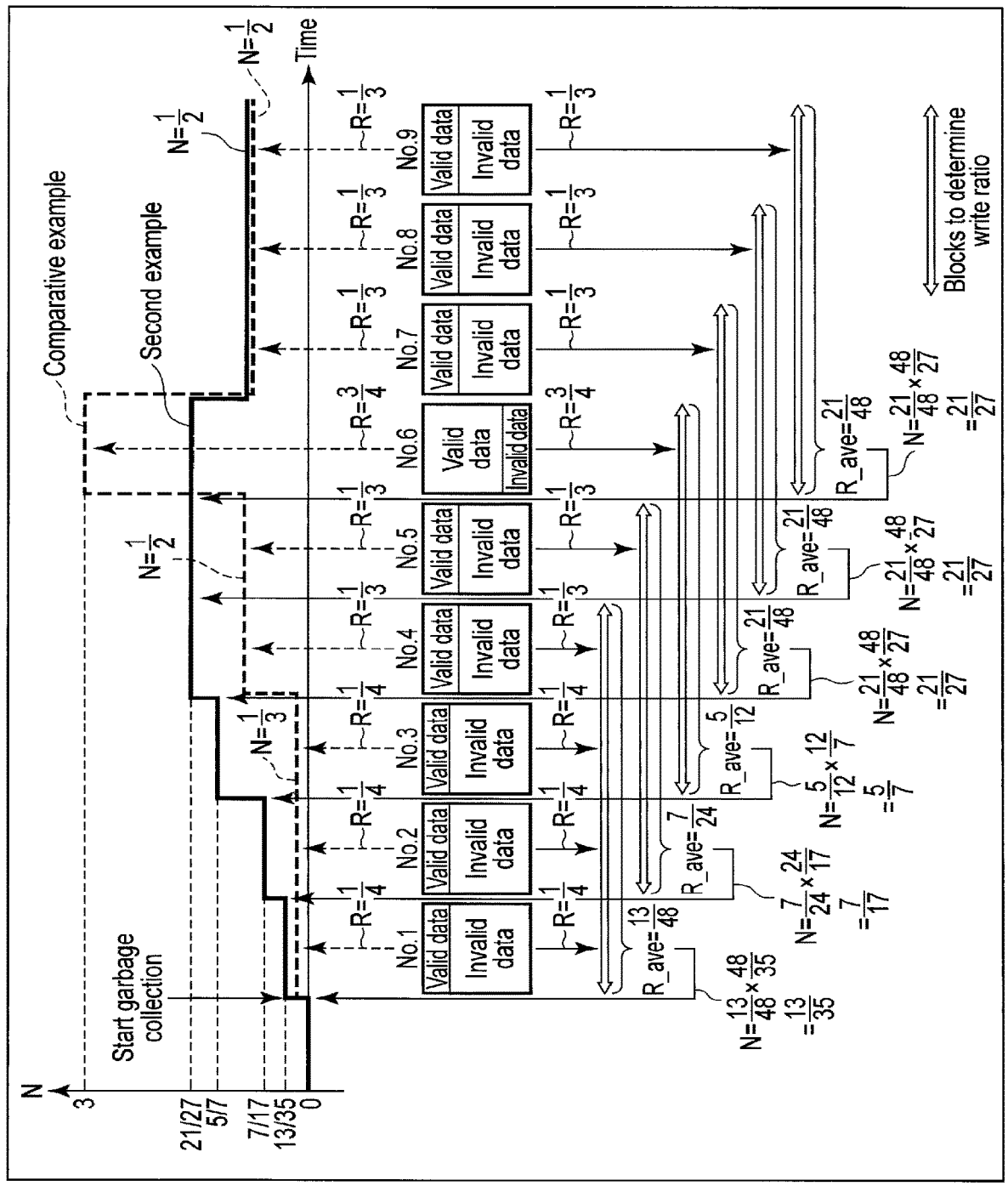
FIG. 9 shows a second example of calculation of a write ratio.

FIG. 8 and FIG. 9 show examples in which the write ratio is calculated.

Here, the example of FIG. 8 is explained.

In the example, the write ratio is determined on the basis of the percentage R of valid data in one single target block from which user data (valid data) is going to be transferred by garbage collection or refresh. In this example, the write ratio depends on R of each target block.

When the percentage R of valid data in block 1 is 1/3, writing of user data in block 1 is performed on the basis of a write ratio of 1:N=1:1/2. From the above equation (1), N=R/(1−R)=(1/3)/(1−1/3)=1/2. Similarly, when the percentages R of valid data in blocks 2, 3 and 4 are 1/3, writing of user data in blocks 2, 3 and 4 is performed on the basis of a write ratio of 1:N=1:1/2.

When block 5 is the target block for refresh, and further when the percentage R of valid data in block 5 is 2/3, writing of user data in block 5 is performed on the basis of a write ratio of 1:N=1:2. From the above equation (1), N=R/(1−R)=(2/3)/(1−2/3)=2. When the target block for garbage collection or refresh is switched from 4 to 5, the write ratio is changed rapidly from 1:1/2 to 1:2.

When viewed from the host, the write amount of user data from the host is decreased rapidly to 1/4. Specifically, the write ratio of block 4 is 1:1/2=2:1, and the write ratio of block 5 is 1:2=1/2:1. Thus, when the write amount of valid data in blocks 4 and 5 is 1, the write amount of user data from the host is changed from 2 to 1/2.

In the first example (shown by the solid line), when writing user data (valid data) in one of target blocks, the write ratio is determined in consideration of the percentages R of valid data in the multiple target blocks. For example, the write ratio is determined on the basis of the average R_ave of the percentages R of valid data in the multiple target blocks.

In this example, the write ratio is leveled among the target blocks. Thus, even when the target block in which garbage collection or refresh is actually performed is switched, the write ratio is not changed rapidly.

This specification explains an example in which the number of blocks used to calculate the write ratio is four. The target block in which garbage collection or refresh is actually performed is selected in the order of 1, 2, 3, 4, 5, and more.

In this case, for example, when the target blocks are blocks 1, 2, 3 and 4, and user data (valid data) in block 1 is written, the write ratio is determined on the basis of the average R_ave of the percentages R of valid data in blocks 1, 2, 3 and 4. Since the percentages R of valid data in each of blocks 1, 2, 3 and 4 are 1/3, the average R_ave is 1/3. Thus, writing of user data in block 1 is performed on the basis of a write ratio of 1:N=1:1/2. From the above equation (1), N=R_ave/(1−R_ave)=(1/3)/(1−7/24)=1/2.

When the target blocks are blocks 2, 3, 4 and 5, and user data (valid data) in block 2 is written, the write ratio is determined on the basis of the average R_ave of the percentages R of valid data in blocks 2, 3, 4 and 5. Since the percentages R of valid data in blocks 2, 3, 4 and 5 are 1/3, 1/3, 1/3 and 2/3, respectively, the average R_ave is (1/3+1/3+1/3+2/3)/4=(5/3)/4=5/12. Thus, writing of user data in block 2 is performed on the basis of a write ratio of 1:N=1:5/7. From the above equation (1), N=R_ave/(1−R_ave)=(5/12)/(1−5/12)=5/7.

When the target blocks are blocks 3, 4, 5 and 6, and user data (valid data) in block 3 is written, the write ratio is 1:N=1:5/7. When the target blocks are blocks 4, 5, 6 and 7, and user data (valid data) in block 4 is written, the write ratio is 1:N=1:5/7. When the target blocks are blocks 5, 6, 7 and 8, and user data (valid data) in block 5 is written, the write ratio is 1:N=1:5/7.

For example, block 5 is the target block for refresh, and the percentage R of valid data in block 5 is great (2/3). Writing of user data in block 5 is performed on the basis of a write ratio of 1:N=1:5/7.

In this example, even when the target block for garbage collection or refresh is switched from 4 to 5, the write ratio is not changed and remains at 1:5/7.

This means that the write amount of user data from the host is stable when viewed from the host. Further, when viewed from the host, the write performance of the memory device (for example, an SSD) is improved with decreasing N.

Now, this specification explains the example of FIG. 9.

The example of FIG. 9 shows a case where the percentages R of valid data in target blocks vary widely in comparison with the example of FIG. 8.

In the comparative example, the write ratio is determined on the basis of the percentage R of valid data in one single target block from which user data (valid data) is going to be transferred by garbage collection or refresh. In this example, similarly, the write ratio is changed depending on each target block.

When the percentages R of valid data in each of blocks 1, 2 and 3 are 1/4, writing of user data in blocks 1, 2 and 3 is performed on the basis of a write ratio of 1:N=1:1/3. From the above equation (1), N=R/(1−R)=(1/4)/(1−1/4)=1/3. When the percentages R of valid data in each of blocks 4 and 5 are 1/3, writing of user data in blocks 4 and 5 is performed on the basis of a write ratio of 1:N=1:1/2. From the above equation (1), N=R/(1−R)=(1/3)/(1−1/3)=1/2.

When block 6 is the target block for refresh, and further when the percentage R of valid data in block 6 is 3/4, writing of user data in block 6 is performed on the basis of a write ratio of 1:N=1:3. From the above equation (1), N=R/(1−R)=(3/4)/(1−3/4)=3.

Thus, when the target block for garbage collection or refresh is switched from 3 to 4, or switched from 5 to 6, the write ratio is changed rapidly.

When the target block for garbage collection or refresh is switched from 5 to 6, the write amount of user data from the host is decreased to 1/6 rapidly. This means that, since the write ratio of block 5 is 1:1/2=2:1, and the write ratio of block 6 is 1:3=1/3:1, the write amount of user data from the host is changed from 2 to 1/3 when the write amount of valid data in blocks 5 and 6 is 1.

In the second example (shown by the solid line), in a manner similar to that of the first example of FIG. 8, when user data (valid data) in one of target blocks is written, the write ratio is determined in consideration of the percentages R of valid data in the multiple target blocks. For example, the write ratio is determined on the basis of the average R_ave of the percentages R of valid data in the target blocks.

In the second example, similarly, the write ratio is leveled among the target blocks. Thus, even when the target block in which garbage collection or refresh is actually performed is switched, the write ratio is not changed rapidly.

In a manner similar to that of the first example of FIG. 8, the number of blocks used to calculate the write ratio is assumed to be four. The target block in which garbage collection or refresh is actually performed is selected in the order of 1, 2, 3, 4, 5, and continuously.

In this case, for example, when the target blocks are blocks 1, 2, 3 and 4, and user data (valid data) in block 1 is written, the write ratio is determined on the basis of the average R_ave of the percentages R of valid data in blocks 1, 2, 3 and 4. Since the percentages R of valid data in blocks 1, 2, 3 and 4 are 1/4, 1/4, 1/4 and 1/3, respectively, the average R_ave is (1/4+1/4+1/4+1/3)/4=(13/12)/4=13/48. Thus, writing of user data in block 1 is performed on the basis of a write ratio of 1:N=1:13/35. From the above equation (1), N=R_ave/(1−R_ave)=(13/48)/(1−13/48)=13/35.

When the target blocks are blocks 2, 3, 4 and 5, and user data (valid data) in block 2 is written, the write ratio is determined on the basis of the average R_ave of the percentages R of valid data in blocks 2, 3, 4 and 5. Since the percentages R of valid data in blocks 2, 3, 4 and 5 are 1/4, 1/4, 1/3 and 1/3, respectively, the average R_ave is (1/4+1/4+1/3+1/3)/4=(14/12)/4=7/24. Thus, writing of user data in block 2 is performed on the basis of a write ratio of 1:N=1:7/17. From the above equation (1), N=R_ave/(1−R_ave)=(7/24)/(1−7/24)=7/17.

Similarly, when the target blocks are blocks 3, 4, 5 and 6, and user data (valid data) in block 3 is written, the write ratio is 1:N=1:5/7. When the target blocks are blocks 4, 5, 6 and 7, and user data (valid data) in block 4 is written, the write ratio is 1:N=1:21/27. When the target blocks are blocks 5, 6, 7 and 8, and user data (valid data) in block 5 is written, the write ratio is 1:N=1:21/27. Further, when the target blocks are blocks 6, 7, 8 and 9, and user data (valid data) in block 6 is written, the write ratio is 1:N=1:21/27.

For example, block 6 is the target block for refresh, and the percentage R of valid data in block 6 is great (3/4). Writing of user data in block 6 is performed on the basis of a write ratio of 1:N=1:21/27.

In this example, even when the target block for garbage collection or refresh is switched from 5 to 6, the write ratio is not changed and remains at 1:21/27. The target block for garbage collection or refresh is switched a plurality of times before block 6, the rate of change in the write ratio is small. This means that the write performance is stable when viewed from the host in a manner similar to that of the first example of FIG. 8.

In the above explanation, the percentage R of valid data in each block is assumed to be constant. For example, the percentage R of valid data in each block is defined as the percentage of valid data in each block at the time when the block is selected as a candidate block.

The percentage of valid data in each block decreases along with the progress of host-write.

Figure 10:
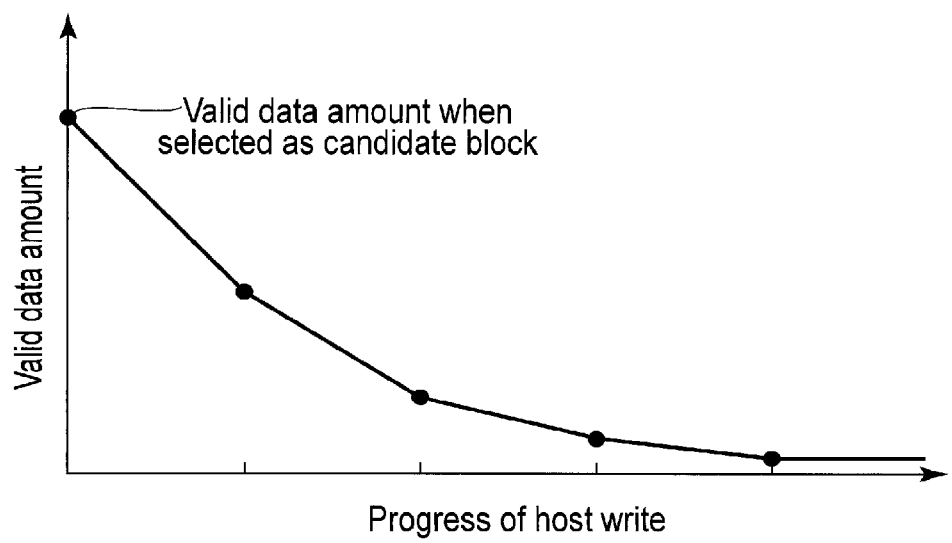
FIG. 10 shows a change in percentage of valid data in a block in connection with progress of host-write.

For example, as shown in FIG. 10, the valid data amount in one block decreases gradually after the time when the one block is selected as a candidate block for garbage collection, in other words, when the one block becomes a candidate for garbage collection.

Decaying factor of decreasing amount of the valid data in the one block depends on the progress of host-write, in other words, how many clusters of user data from the host is written.

In consideration of the above factor, the valid data amount at a given time may be estimated or measured. For example, the valid data amount at the given time is estimated on the basis of a first time and a second time before the given time, where the first time is a time when the one block is selected as the candidate block for garbage collection and the second time is a time after the first time.

Change of the valid data amount from the first time to the second time is effective to estimate the valid data amount which depends on the progress of host-write.

Figure 11:
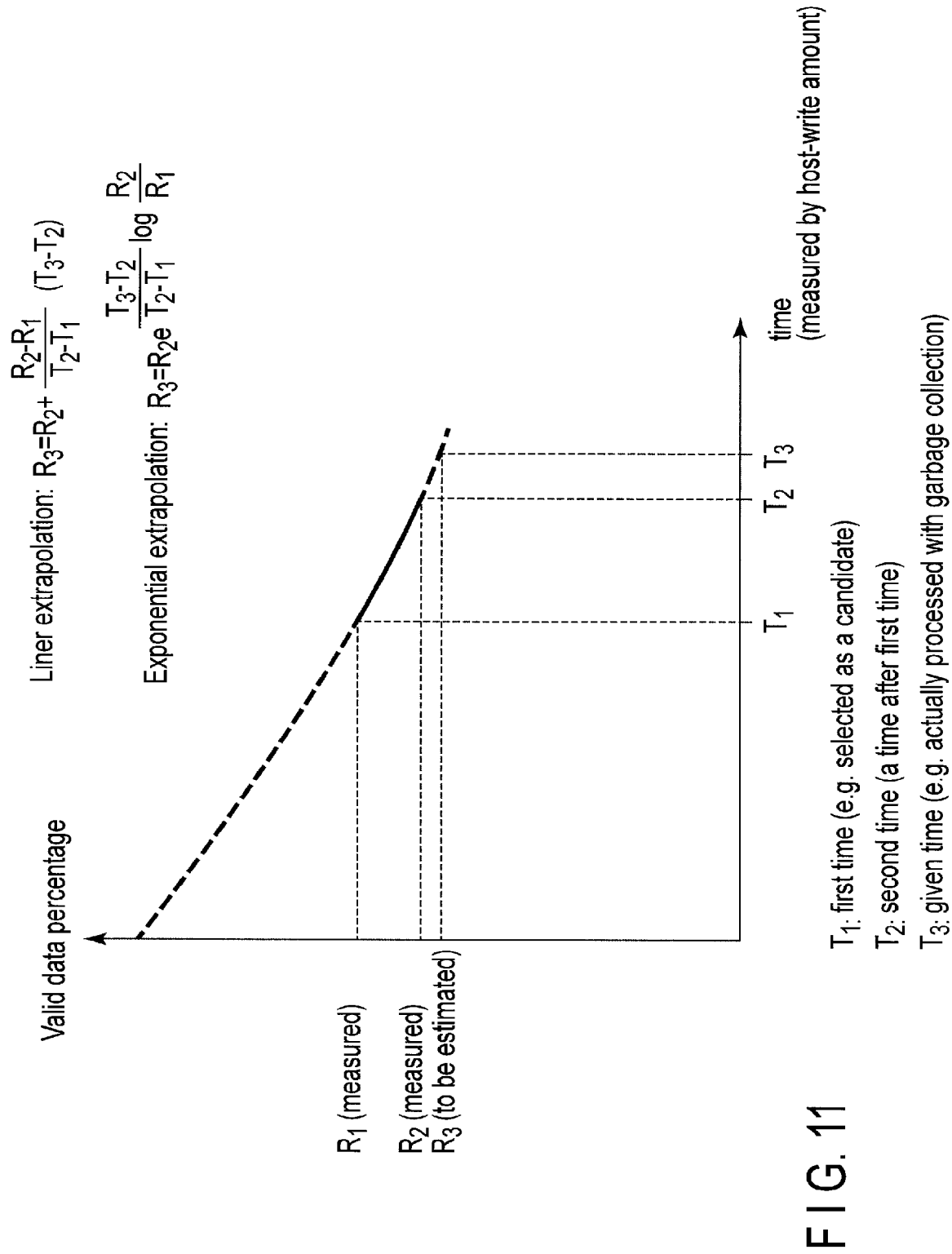
FIG. 11 shows an example of obtaining a valid data percentage at a given time.

As shown in FIG. 11, the valid data amount $R_3$ at the given time $T_3$ can be estimated by a linear extrapolation or an exponential extrapolation. For example, the valid data amount $R_3$ at the given time $T_3$ is estimated by referring to the valid data amount $R_1$ at the first time $T_1$ and the valid data amount $R_2$ at the second time $T_2$. The first and second times $T_1$, $T_2$ can be determined on the basis of a progress of the host-write amount.

The write ratio (1:N) used to actually transfer valid data with regard to a given block is determined on the basis of the estimated or measured percentage of the valid data amount in the one block (the target block for garbage collection) at the given time.

When the percentage of the valid data amount in the one block at the first time when the one block is selected as a candidate block for garbage collection is R_ini, the percentage R_x of the valid data amount in the one block at the second time may be determined on the basis of the decaying factor of valid data.

For example, the decaying factor of valid data is changed depending on the progress of host-write after the first time.

For example, as shown in FIG. 12, when the percentage of valid data in block No. A in which the progress of host-write is small is used to calculate the write ratio after the first time, the percentage R_x of valid data in block No. A used for the calculation is R_ini×(1−α1). In this example, since R_ini=1/4, and decaying factor α1=0.1=1/10, R_x=(1/4)×(9/10)=9/40.

When the percentage of valid data in block No. B in which the progress of host-write is greater than block No. A is used to calculate the write ratio after the first time, the percentage R_x of valid data in block No. B used for the calculation is R_ini×(1−α2). In this example, since R_ini=1/2, and decaying factor α2=0.15=3/20, R_x=(1/2)×(17/20)=17/40.

When the percentage of valid data in block No. C in which the progress of host-write is greater than block No. B is used to calculate the write ratio after the first time, the percentage R_x of valid data in block No. C used for the calculation is R_ini×(1−α3). In this example, since R_ini=3/4, and decaying factor α3=0.3=3/10, R_x=(3/4)×(7/10)=21/40.

As shown in the example, the decaying factor α may be increased (0.1→0.15→0.3) depending on the progress of host-write. Alternatively, the decaying factor α may be constant. The decaying factor may be changed depending on the environment in which the memory system is used, for example, for enterprise such as a cloud data center sever, or for clients such as mobile products.

The decaying factor may be an actual measurement value or may be set as a constant number in advance.

CONCLUSION

As explained above, in the embodiments and modification examples, the write ratio is determined on the basis of the percentages of valid data in target blocks for garbage collection or refresh. Therefore, the write ratio is leveled, and a rapid change in the write ratio can be prevented. Thus, when viewed from the host, the write performance of user data from the host does not deteriorate rapidly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory having memory blocks; and
a controller configured to:
receive a request for writing user data from a host;
select at least a first block having a first percentage of valid data among the memory blocks;
determine a second percentage different from the first percentage on the basis of at least the first percentage of the valid data in the first block;
determine a first ratio between a write amount of the user data in accordance with the request from the host and a write amount of the valid data in at least the first block on the basis of the second percentage determined; and
write the user data and the valid data in the first block into the nonvolatile memory on the basis of the first ratio.

2. The system of claim 1, wherein
the controller selects at least the first block as a target of a garbage collection process.

3. The system of claim 1, wherein
the controller determines 1:N as the first ratio, where N=R/(1−R), N is a write amount of the valid data in the first block into the nonvolatile memory when a write amount of the user data into the nonvolatile memory is 1, and R is the second percentage, and wherein N is a number greater than or equal to zero and R is a number greater than or equal to zero and less than one.

4. The system of claim 1, wherein
at least the first block includes the first block, a second block, and a third block, and
the controller selects the third block from the memory blocks after writing the valid data in the first block, determines a fourth percentage on the basis of a second percentage of valid data in the second block and a third percentage of valid data in the third block, determines a second ratio between a write amount of user data into the nonvolatile memory and a write amount of the valid data in the second block into the nonvolatile memory on the basis of the fourth percentage, and writes the user data and the valid data in the second block on the basis of the second ratio.

5. The system of claim 1, wherein
the controller changes the first block to a free block having no valid data after writing the valid data in the first block.

6. A method for controlling a memory system including a nonvolatile memory having memory blocks, the method comprising:
receiving a request for writing user data from a host;
selecting at least a first block having a first percentage of valid data among the memory blocks;
determining a second percentage different from the first percentage on the basis of at least the first percentage of the valid data in the first block;
determining a first ratio between a write amount of the user data in accordance with the request from the host and a write amount of the valid data in at least the first block on the basis of the second percentage determined; and
writing the user data and the valid data in the first block into the nonvolatile memory on the basis of the first ratio.

7. The method of claim 6, wherein
the selecting comprises selecting at least the first block as a target of a garbage collection process.

8. The method of claim 6, wherein
the determining of the first ratio comprises determining 1:N as the first ratio, where N=R/(1−R), N is a write amount of the valid data in the first block into the nonvolatile memory when a write amount of the user data into the nonvolatile memory is 1, and R is the second percentage, wherein N is a number greater than or equal to zero and R is a number greater than or equal to zero and less than one.

9. The method of claim 6, wherein
at least the first block includes the first block, a second block, and a third block, and
the method further comprises
selecting the third block from the memory blocks after writing the valid data in the first block, determining a fourth percentage on the basis of a second percentage of valid data in the second block and a third percentage of valid data in the third block, determining a second ratio between a write amount of user data into the nonvolatile memory and a write amount of the valid data in the second block into the nonvolatile memory on the basis of the fourth percentage, and writing the user data and the valid data in the second block on the basis of the second ratio.

10. The method of claim 6, further comprising changing the first block to a free block having no valid data after writing the valid data in the first block.

* * * * *